United States Patent [19]

Dietz

[11] 4,186,260

[45] * Jan. 29, 1980

[54] OLEFIN POLYMERIZATION PROCESS

[75] Inventor: Richard E. Dietz, Bartlesville, Okla.

[73] Assignee: Phillips Petroleum Company, Bartlesville, Okla.

[*] Notice: The portion of the term of this patent subsequent to Jun. 3, 1992, has been disclaimed.

[21] Appl. No.: 930,081

[22] Filed: Aug. 1, 1978

Related U.S. Application Data

[60] Division of Ser. No. 792,732, May 2, 1977, Pat. No. 4,119,569, which is a continuation of Ser. No. 363,482, May 24, 1973, abandoned, which is a division of Ser. No. 89,047, Nov. 12, 1970, abandoned.

[51] Int. Cl.$^2$ .......................... C08F 4/02; C08F 4/78; C08F 10/02; C08F 10/08
[52] U.S. Cl. .................................. 526/106; 252/452; 252/458; 252/469; 526/96; 526/107; 526/113
[58] Field of Search ................... 526/106, 96, 107, 113

[56] References Cited

U.S. PATENT DOCUMENTS

| | | | |
|---|---|---|---|
| 3,622,521 | 11/1971 | Hogan et al. | 526/96 |
| 3,625,864 | 12/1971 | Horvath | 526/106 |
| 3,780,011 | 12/1973 | Pullukat et al. | 526/106 |
| 3,798,202 | 3/1974 | Nasser, Jr. | 526/106 |
| 3,862,104 | 1/1975 | Witt | 526/106 |
| 3,887,494 | 6/1975 | Dietz | 526/106 |
| 3,950,316 | 4/1976 | Witt | 526/113 |
| 4,001,196 | 1/1977 | Witt | 526/106 |
| 4,009,327 | 2/1977 | Witt | 526/106 |
| 4,011,382 | 3/1977 | Levine et al. | 526/106 |
| 4,053,436 | 10/1977 | Hogan et al. | 526/106 |
| 4,119,569 | 10/1978 | Dietz | 526/107 |

*Primary Examiner*—Alan Holler

[57] ABSTRACT

A method for preparing a composition of matter comprising silica and titanium, convertible to a catalyst suitable for olefin polymerization by the addition of chromium and the process performable therewith, the preparation involving adding an alkali metal silicate to an acid containing a titanium compound, and recovering a dry gel for use as a polymerization catalyst upon the addition of chromium.

13 Claims, No Drawings

OLEFIN POLYMERIZATION PROCESS

This is a divisional of copending application Ser. No. 792,732, filed May 2, 1977 now U.S. Pat. No. 4,119,569 which in turn was a continuation of then copending application Ser. No. 363,482, filed May 24, 1973, now abandoned, which in turn was a division of copending application Ser. No. 89,047, filed Nov. 12, 1970, now abandoned.

This invention relates to olefin polymerization.

In one of its more specific aspects, this invention relates to a polymerization process and to an improved catalyst.

It is known that the melt indices and densities of olefin polymers, such as polyethylene, are influenced by the character of the catalyst. A discussion of this subject as pertaining to that process, the general nature of which is set forth in U.S. Pat. No. 2,825,721 to Hogan et al, is contained in U.S. Pat. No. 3,225,023 to Hogan et al, both of these patents being incorporated herein by reference.

This prior art teaches that polymers may be produced employing a catalyst comprising a chromium oxide dispersed on a substrate such as silica. Other prior art teaches the impregnation of such catalyst with titanium compounds. Comparatively, the polymers produced when employing titanium-containing catalysts are generally recognized as having higher melt indices. This is a desirable characteristic. Unfortunately, however, polymers, particularly copolymers produced by the prior art titanium-containing catalysts, also possess higher densities than those produced by catalysts containing no titanium. While the increase in density is generally small, a small increase sometimes limits the number of applications in which the polymer can be commercially employed. Hence, it would be advantageous if there was developed a catalyst which would produce high melt index, low density polymers. The catalysts of this invention and the method of their use produce high melt index, low density polymers, and, as a result, enable the production of polymers which are usable over a wide range of applications.

According to this invention there is provided a method for the preparation of a composition of matter comprising silica, chromium, and titanium. A compound of titanium is incorporated in a mineral acid, preferably sulfuric acid, and the silica precursor is introduced into the acid. The dry gel which is recovered is then impregnated with an agent, preferably a chromium compound, and the impregnated silica is activated to produce a catalytic substance active in the production of high melt index, low density polymers.

In one embodiment of this invention, there is formed a mixture comprised principally of the hydrogel and a normally liquid oxygen-containing organic compound which is soluble in water, and the organic compound and water are separated from the gel to produce a substantially water-free composition which is then impregnated with a chromium compound and activated to produce the catalyst.

In another embodiment of this invention, a titanium compound and a chromium compound are both incorporated in the acid prior to the formation of the gel.

In as much as the best mode for carrying out this invention involves the use of titanium oxide in combination with chromium oxide, the invention will be illustrated employing these compounds although the invention is not to be considered as being limited thereto.

The catalyst of this invention is employable in a process for the polymerization of at least one polymerizable 1-olefin at a polymerization temperature up to about 500° F. with a catalyst active for polymerization and comprising chromium oxide, titanium oxide and a silica-containing substrate, at least a part of the chromium being in the hexavalent state at the initial contacting of hydrocarbon with the catalyst, the substrate or support of the catalyst, or the catalyst, itself, being prepared in accordance with the method of this invention. Advantageously, the polymerization can be directed to the production of polyethylene and copolymers of ethylene with another 1-olefin such as butene, hexene and the like.

The general nature of the preparation to which the method of this invention applies is that preparation in which a hydrogel is prepared by mixing an aqueous solution of the alkali metal silicate with a strong acid such as sulfuric acid, this mixing being done under suitable conditions of agitation. The concentration of the $SiO_2$ in the hydrogel which is formed is usually in the range of between about 3 and about 12 weight percent with the pH of that gel being from about 3 to about 9. A wide range of mixing temperatures can be employed, this range being from about 33° F. to about 110° F.

After gelling, the mixture is aged. This can be carried out at the usual temperatures within the range of about 65° F. to about 200° F. Generally, aging times greater than one hour are used.

Following aging, the gel is agitated to produce a slurry which is washed several times with water and with either an ammonium salt solution or dilute acid to reduce the alkali metal content of the gel to less than about 0.1 weight percent. While various ammonium salts and dilute acid solutions can be employed, the preferred salts are those, such as ammonium nitrate and ammonium salts of organic acid, which decompose and volatilize upon subsequent calcination.

Water is removed from the hydrogel in any suitable manner and preferably by washing with a normally liquid organic compound which is soluble in water, or by azeotropic distillation employing an organic compound. This procedure produces a composition, a silica xerogel, which is used as a substrate.

Thereafter, this composition can have incorporated into it a chromium compound which is subsequently converted to chromium oxide by activation, at least a part of the chromium being converted to the hexavalent state in which form the composition is employed as a catalyst in olefin polymerization. This activation is conducted by heating the composition in air at a temperature between about 900° F. and about 1800° F.

The present invention pertains to modifications applicable to the aforementioned process. However, the method of this invention applies to all methods which are generally related to the preparation of gels and is not to be considered as being limited to the process conditions specifically described above.

The present invention produces a superior catalyst by a combination of steps which pertain to incorporating the titanium compound, and if desired, the chromium compound in the acidic compound and adding the alkali metal silicate to the acidic compound.

The titanium compound can be incorporated in the acid in any form in which it will be subsequently incorporated in the silica gel formed upon the addition of the silicate to the acid and from which form it is subsequently convertible to titanium oxide. Compounds suitable include inorganic and organic compounds of titanium such as the halides (i.e., $TiCl_3$ and $TiCl_4$), nitrate, sulfate, oxalate, alkyl titanates, etc. The titanium compound is incorporated in the acid such that the amount of titanium present as an oxide in the catalyst after calcination is within the range of about 1 to about 10 weight percent of the total weight of the catalyst.

In that instance in which the chromium compound is incorporated in the acid with the titanium compound, it can be incorporated in any form convertible to chromium oxide upon calcination. Suitable chromium salts include chromium acetate, chromium chloride, chromium trioxide, chromium sulfate, etc. Sufficient salt will be incorporated in the acid to the extent that there is contained in the final catalyst after calcination an amount from 0.1 to 10 or more weight percent chromium as chromium oxide although amounts as high as 50 weight percent have been employed.

To the volume of acid to which the titanium compound or the titanium compound and the chromium compound have been added, the silicate is added in any suitable manner while suitably agitating the mixture to facilitate the reaction between the silicate and the acid.

As concerns the removal of water from the hydrogel to produce the xerogel, one method of this invention forms a mixture of the hydrogel and a normally liquid oxygen-containing organic compound which is soluble in water. Removal of the water from the gel is effected by repeated washing with the organic compound or by azeotropic distillation. Preferably, azeotropic distillation is employed. Suitable oxygen-containing compounds include methyl isobutyl ketone, ethyl acetate, sec-butyl alcohol, n-propyl alcohol, butyraldehyde, diisobutyl ether, isopropyl acetate, and the like.

The composition, or substrate, produced by the method of this invention, if prepared without the inclusion of the chromium compound in the acid, is prepared for employment in olefin polymerization by depositing the chromium on it by methods which include solution impregnation and dry mixing techniques. If the process has been carried out with a chromium compound in the acid to deposit the chromium on the substrate, no further treatment with chromium is necessary, although further impregnation can be made.

The above-described method of removing the water from the hydrogel is directed towards removing sufficient water from the internal structure to substantially preserve such structure and that subsequent steps to which the substrate is subjected will not collapse the pores of the catalyst. For this reason, the substrate is impregnated with the chromium compound in the substantial absence of water. Relatedly, the substrate, after its preparation and before its impregnation, will preferably be maintained such that the quantity of moisture which it absorbs is limited such that when impregnated with the chromium compound from nonaqueous solutions or by dry mixing, such impregnation will occur substantially in the absence of water. The impregnation of the substrate with the chromium compounds is carried out by conventional methods and followed by the usual calcination. After calcining, the resulting catalyst is employed in olefin polymerization employing any of the techniques which are employed when utilizing catalysts comprising a chromium compound on a silica substrate.

The substrates produced by the method of this invention have a surface area of 200–500 meters$^2$/gram, a pore size of 200 to 600 /Å, a pore volume of 1.8 to 3.5 cc/gram based on nitrogen and a narrow pore size distribution.

Preferred modes of carrying out the method of this invention are illustrated in the following examples. However, these examples are not to be considered in any way as limiting the invention to the specifics of the examples.

EXAMPLE I

Preparation of the Catalyst

To 43 grams of 95 percent sulfuric acid were added 4.25 grams (2.5 ml) of titanium tetrachloride, $TiCl_4$. After admixture of the titanium tetrachloride with the acid, the solution was diluted with water to a volume of about 270 ml in which the concentration of the acid was about 10 percent.

Into this solution was then introduced a mixture of 255 grams of water glass having a 3.2 to 1 $SiO_2$ to $Na_2O$ ratio, a solids content of 38 percent and a density of 1.39 g/cc and 255 grams of water. Addition was made at a temperature of about 41° F. at atmospheric pressure.

The gel which was formed had a pH of about 6.0. After aging about four hours at about 194° F., it was washed, dried, and impregnated with chromium by slurrying with a solution of chromium acetylacetonate dissolved in ethyl acetate, and activated at 1600° F. By this method there was produced the catalyst of this invention which comprised about 1.4 weight percent titanium containing compound (2.2 weight percent titanium dioxide) and about 1 weight percent chromium in the form of chromium oxide.

EXAMPLE II

Preparation of the Catalyst

The procedure of Example I was carried out substantially as set forth above except that titanium tetrachloride and chromium nitrate was dissolved in the acid prior to the introduction thereinto of the sodium silicate. No subsequent impregnation of the gel with a chromium compound after recovery of the gel was made and the catalyst was activated as in Example I. This procedure produced a catalyst comprising about 2.6 weight percent titanium and about 1 weight percent chromium, both metals being in the form of oxides, as a catalyst of this invention.

EXAMPLE III

Preparation of the Catalyst

A portion of that catalyst prepared in Example II was impregnated, prior to activation with chromium, by slurrying with an ethyl acetate solution of chromium acetylacetonate to deposit on the catalyst an additional amount of chromium compound and to increase the total chromium content of the catalyst to about 2 percent as chromium oxide. The catalyst was thereupon activated at 1600° F. to produce the catalyst of this invention.

EXAMPLE IV

A series of three runs were carried out under substantially identical conditions to copolymerize ethylene and butene-1.

The first run was conducted with a commercially available catalyst comprising a silica base and chromium oxide and containing no titanium.

The second run was conducted with that catalyst of Run I, the catalyst having been impregnated with a titanium compound by the application to the catalyst by conventional slurrying techniques with tetraisopropyl titanate. The finished catalyst contained about 2.8 weight percent titanium in the form of the oxide.

A third run was conducted employing the catalyst and method of this invention, the catalyst having been prepared substantially in accordance with that procedure outlined in Example I, above, such that the catalyst was comprised of 2.6 weight percent titanium calculated from the oxide. In all instances, activation temperatures were about 1600° F. Results were as follows:

| Run No. | Productivity, lb/lb[1] | Polymer Properties | |
|---|---|---|---|
| | | Melt Index[2] | Density[3] |
| I | 2995 | 3.7 | 0.927 |
| II | 2750 | 6.8 | 0.935 |
| III | 3100 | 5.4 | 0.927 |

[1] Lbs. product per lb. of catalyst.
[2] ASTM D 1238-62T, grams per 10 minutes.
[3] ASTM D 1505-63T, grams per cc.

The above data illustrate the operability of the method and catalyst of this invention. A comparison between the results of Run I and Run II indicate the production of a higher melt index polymer produced with the catalyst of Run II and than is produced with the catalyst of Run I. However, the density of the polymer of Run II is undesirably high. However, when a polymer was produced by the method and catalyst of this invention, Run No. III, it possessed the desirable high melt index and the desirable low density of the polymer of Run I.

It will be evident from the foregoing that various modifications can be made to this invention. Such, however, are considered as being within the skill of the invention.

I claim:

1. A method for polymerizing at least one 1-olefin which comprises contacting said olefin with a catalyst prepared by
   a. combining a titanium compound and a mineral acid;
   b. introducing an alkali metal silicate into the acid containing said titanium compound to form a hydrogel;
   c. aging the hydrogel for a time of greater than one hour;
   d. washing the thus aged hydrogel to produce a substantially alkali metal-free hydrogel;
   e. forming a mixture comprising the thus washed hydrogel and a normally liquid oxygen-containing, water soluble organic compound;
   f. separating said organic compound and water from said mixture to form a xerogel; and,
   g. heating said xerogel also containing chromium at a temperature of 900° to 1800° F.

2. A method according to claim 1 in which said titanium compound comprises a compound convertible to titanium oxide upon calcination.

3. A method according to claim 1 in which said hydrogel is activated to convert said titanium compound to an oxide, the amount of said oxide in the activated catalyst being within the range of from about 1 to about 10 weight percent.

4. A method according to claim 1 in which said titanium compound is titanium tetrachloride.

5. A method according to claim 1 in which said acid contains a chromium-containing compound convertible to chromium oxide.

6. A method according to claim 5 in which said hydrogel is activated to convert said chromium compound to an oxide, the amount of the chromium oxide in the activated catalyst being within the range of from about 0.1 to about 50 weight percent.

7. A method according to claim 5 wherein said aging is at a temperature within the range of 65° to 200° F.

8. A method according to claim 1 wherein said xerogel is impregnated with a chromium compound prior to heating to said temperature of 900° to 1800° F.

9. A method according to claim 1 wherein said washing is done with either an ammonium salt solution or a dilute acid and with water.

10. A method according to claim 1 wherein said alkali metal silicate is added to said acid at a temperature within the range of 33°-110° F. until a final pH within the range of 3-9 is reached, said resulting hydrogel having a concentration of $SiO_2$ within the range of 3 to 12 weight percent.

11. A method according to claim 10 wherein said washing is done with either an ammonium salt solution or a dilute acid and with water.

12. A method according to claim 1 wherein said 1-olefin comprises ethylene.

13. A method according to claim 1 wherein ethylene and butene-1 are copolymerized.

* * * * *